United States Patent [19]
Lane

[11] Patent Number: 5,437,009
[45] Date of Patent: Jul. 25, 1995

[54] METHOD AND SYSTEM FOR DISPLAYING STATUS INFORMATION OF COMMUNICATIONS NETWORKS

[75] Inventor: Darrin J. Lane, Piscataway, N.J.

[73] Assignee: Bell Communications Research, Inc., Livingston, N.J.

[21] Appl. No.: 18,963

[22] Filed: Feb. 18, 1993

[51] Int. Cl.⁶ .............................................. G06F 3/00
[52] U.S. Cl. ................................... 395/161; 395/155; 395/600; 395/700; 340/825.03
[58] Field of Search ............... 395/161, 155, 157, 158, 395/159; 364/130, 188, 193; 340/825; 345/117-120

[56] References Cited

U.S. PATENT DOCUMENTS

| | | | |
|---|---|---|---|
| 4,688,181 | 8/1987 | Cottrell et al. | 364/521 |
| 5,049,873 | 9/1991 | Robins et al. | 340/825.06 |
| 5,086,385 | 2/1992 | Launey et al. | 364/188 |
| 5,136,690 | 8/1992 | Becker et al. | 395/161 |

OTHER PUBLICATIONS

Screens from *WordPerfect*, WordPerfect Corporation, Apr. 30, 1992.
Ramaswami et al., "Analysis of the Link Error Monitoring Protocols in the Common Channel Signaling Network", IEEE Transactions on Networking, Feb. 1993, pp. 31-47.
Meyer, Robert A.; "GUS: A Graphical System For Capturing Structural Knowledge About Communications Networks", IEEE Intl Conference, 1985, pp. 1714-1718.

*Primary Examiner*—Mark R. Powell
*Assistant Examiner*—Robert Andrews
*Attorney, Agent, or Firm*—Leonard Charles Suchyta; James W. Falk

[57] ABSTRACT

Method and system are provided for graphically displaying status information from alarm message generated during outages of a network such as a Common Channel Signaling (CCS) Network. The method and system include play, search, stop, filter, and pause features to efficiently analyze network-wide CCS events. In this way, the information is logically shrunk to a manageable size without losing information important to engineer and administer the network.

24 Claims, 3 Drawing Sheets

METHOD AND SYSTEM FOR DISPLAYING STATUS INFORMATION OF COMMUNICATIONS NETWORKS

TECHNICAL FIELD

This invention relates to methods and systems for displaying network status information and, in particular, to methods and systems for displaying network status information utilizing a graphical interface.

BACKGROUND ART

A Common Channel Signaling (CCS) network is a high speed packet switch network that is used for trunk signaling and for the provisioning of enhanced network services such as 800 Service, Alternate Billing Services (ABS), Private Virtual Networks (PVN), Area Wide Centrex, etc. CCS is provided in accordance with specifications for Signaling System 7 (SS7) protocol.

As illustrated in FIG. 1, the CCS network, generally indicated at 10, consists of the following Network Elements: CCS switching offices which are stored program controlled switching systems Signaling Transfer Points (STP), and Service Control Points (SCP). The CCS Switching Office is the CCS network interface to the voice network. It is capable of generating and receiving CCS messages for call set-up. CCS SO's equipped with additional software capable of formulating queries for transaction based services are called Service Switching Points (SSPs) and access other nodes in the CCS network via signaling links to Signaling Transfer Points (STPs). The STPs are specialized packet switches that serve as intermediate message transport switches. The STP performs routing for trunk signaling and global title translation for enhanced services. The SCP is the network component which provides the enhanced services mentioned above.

Referring still to FIG. 1, the SEAS ™ (a trademark of the assignee of the present application) system is the primary support system that is responsible for the administration of the CCS network and the engineering of its components. Thorough administration of the CCS network requires close surveillance of CCS activity and careful provisioning and management of CCS related components. CCS related components include, where applicable, buffers, processors, and data buses, and the signaling links and linksets they serve. Engineering of the CCS network requires analysis of collected traffic and performance measurements for the purpose of sizing the various CCS related components.

The specific administrative features the SEAS system provides are Recent Change and Verification (RC&V), Network Management, Surveillance for Maintenance, and Network Monitoring and Surveillance for Administration. The specific engineering features the SEAS system provides are data validation and summarization and busy hour determination among other functions performed by Data Analysis. Supporting both the administrative and engineering operations are Data Collection and a Network Configuration Records Base (NCRB).

Routing and translation tables at the STP facilitate the switching of SS7 messages. For those STPs able to switch inter-network traffic, a set of screening tables support the discrimination of allowed messages. Recent Change messages update those routing tables as needed to effect changes in routing and/or screening patterns. The Verify capability enables synchronization of the routing tables with the "ineffect" copy kept at the SEAS system.

In order to engineer and administer the CCS network, the SEAS system collects various types of measurement data from the network components. The collected data allows users to monitor service levels on a near-real-time basis using thresholding capabilities provided with the SEAS Network Monitoring and Surveillance for Administration feature. Different types of measurement data are collected at different intervals, e.g. traffic and performance measurements at 30 minute intervals and network management data at 5 minute intervals.

Recent outages in Common Channel Signaling (CCS) Networks have raised questions about their survivability. Analyzing outage data is important for recognition and avoidance of CCS problems.

SUMMARY OF THE INVENTION

An object of the present invention is to provide a method and system for efficiently presenting status information on a screen display by logically shrinking the information to a manageable size without losing important information.

Another object of the present invention is to provide a method and system for providing network-wide, iterative analysis of status information which increases efficiency through "logical shrinking" of data and for presenting simultaneous events clearly to thereby enhance training. As a result, understanding of outages is increased.

Still another object of the present invention is to provide a method and system which has "search," "filter," and "pause" capabilities which can be used to efficiently analyze network-wide CCS events.

In carrying out the above objects and other objects of the present invention, in a support system for a network, a method is provided for presenting status information generated upon a change in status of the network at a work station including a computer and a display device connected to the computer. The display device has a display screen for displaying graphic objects and text strings thereon. The method includes the steps of providing a knowledge base for storing a multiplicity of information records. The information records include means for denoting the status information that can be presented on the display screen. The status information includes time data representing the time at which the status information was generated. The information records also include means for denoting a set of mode control graphic objects that can be displayed on the display screen. The set of mode control graphic objects represent different modes of reviewing the status information. The method also includes the steps of displaying the set of mode control graphic objects on the display screen and selecting one of the set of mode control graphic objects displayed on the display screen to identify a desired mode of review of the status information. The method further includes the steps of receiving a start time command, displaying a start time on the display screen in response to the start time command, and sequentially reviewing the status information based on the identified desired mode of review, the time data of the status information and the start time command. Finally, the method includes the step of displaying status information on the display screen based on the results of the step of reviewing.

Preferably, the method also includes the steps of receiving an end time command and displaying an end time on the display screen in response to the end time command. The step of reviewing is performed on the status information having time data indicating a time between the start time and the end time.

Also, preferably, the method includes the steps of displaying a conditional pause graphic object on the display screen, receiving a conditional pause command, and displaying a text string associated with the conditional end graphic object on the display screen in response to the conditional pause command. The step of reviewing is also based on the conditional pause command.

A system for carrying out each of the above method steps is also provided.

The advantages accruing to the use of the above method and system are numerous. For example, besides providing a means for systemically repeating outage events, the invention yields the following advantages over current techniques:

- Network-wide analysis shows how events in one part of the network may have affected events in another. Looking at the network one component at a time is no longer effective, given the strong interdependencies of the CCS network. The network-wide view also provides a means of analyzing simultaneous events.
- The visual patterning provided by the invention allows faster recognition of problems. This, in turn, provides a means of recognizing problems more quickly in the future.
- When many events occur in a short time span, for example, one hundred link failures in a few seconds, one may miss some of the details. The invention allows stepping through these events at any fraction of real time.
- When events occur across large spans of time, for example, a link fails recovering hours later, one may not wish to view intervening events to see the recovery. The invention allows fast forwarding to the desired event.
- The invention and its functions can be used to build "analysis scripts." These scripts will eliminate ad-hoc techniques that can miss important information.
- Training materials for network personnel can be acquired from the invention. An actual problem can be viewed as it occurred from the point of view of the system.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
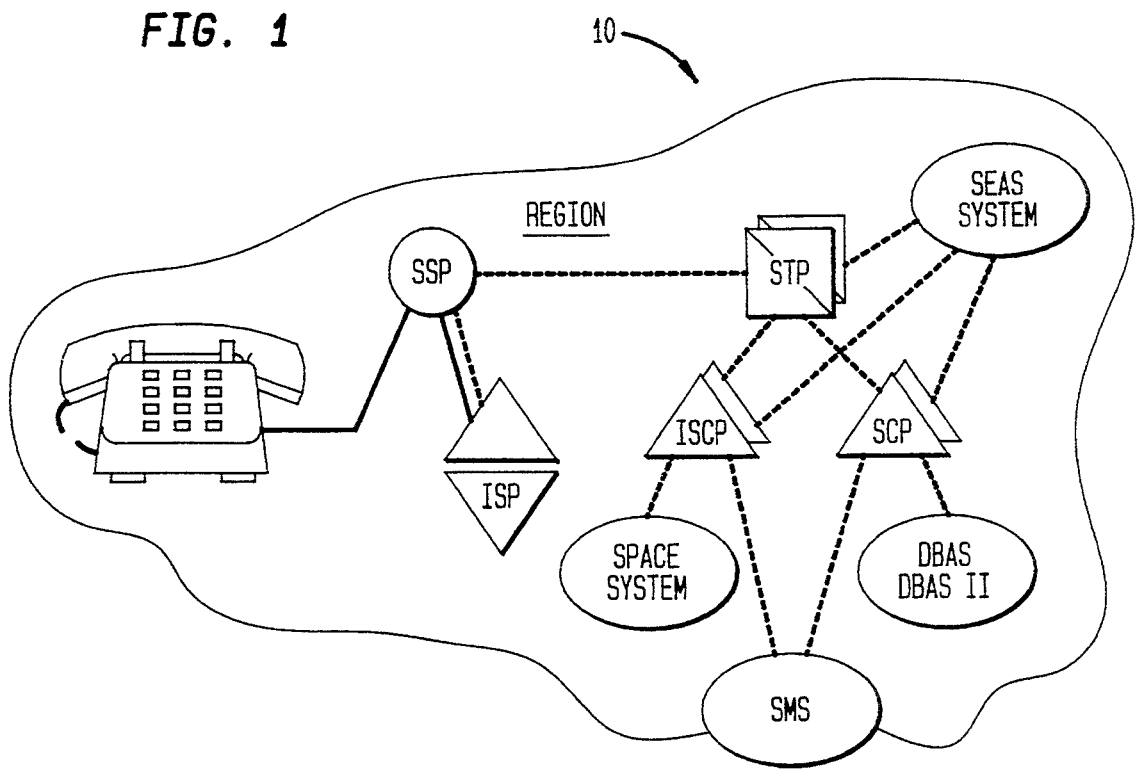
FIG. 1 is a schematic diagram of a network and its support system in which the method and system of the present invention is utilized.
Figure 2:
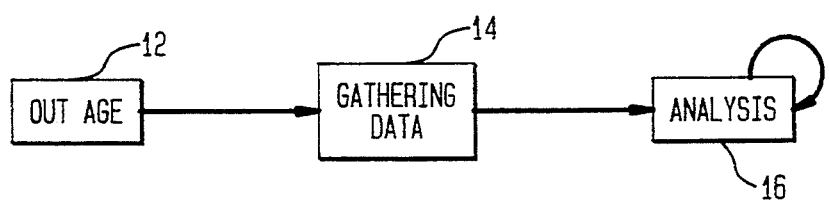
FIG. 2 is a block diagram flow chart illustrating the flow of events involved in analyzing a network outage.

Referring now to the drawings figures, there is illustrated in FIG. 2 the series of events involved in analyzing a network outage. First, an outage needs to occur as illustrated at block 12. After the outage, data is gathered, as illustrated at block 14, from various sources that have recorded status information regarding the nodes and links of the network of FIG. 1. The analysis phase, as illustrated at block 16, determines what happened and how to avoid it in the future. This phase usually employs ad-hoc techniques developed "on the fly" to determine the significant events and their probable causes. The following are sample events:

Rept PRORECD by EBRUNJBL01A from SRIVNJAE12C on LS000030-00

Rept PRORECD by EBRUNJBL01A from SRIVNJAE12C on LS000030-01

Rept LKF-XER by EBRUNJBL01A on link LS000030-02

Rept MGTINH by EBRUNJBL01A on link LS000030-03

Rept LKSTO by EBRUNJBL01A on linkset LS000030

Rept LKF-XER by WDBRNJSP13B on link LS000031-01

Rept XMT-CGST=(3rd, Onset) by WDBRNJSP 13B on link LS000031-03

Rept LKF-HWP by WDBRNJSP13B on link LS000008-01

Rept LKF-HWP by EBRUNJBL01A on link LS000008-02

Rept LKSTO by EBRUNJBL01A on linkset LS000008

Rept all routes unavailable from EBRUNJBL01A to SRIVNJAE12C.

Typically, print outs containing information logged during the outage become the primary source of information. Many iterations are preformed to get at the interesting information hidden in mounds of data. The method and system provide a technique for cutting through the large amount of data to get to what is interesting. That is, the method and system logically shrink the outage data without losing information important to the user.

As described herein, a status change to a monitored object is conveyed via a message whenever a set of messages has been gathered from some data source. This set is called the message set. All status messages come from the message set. The messages are time stamped and are in chronological order in a database or knowledgebase.

Figure 3:
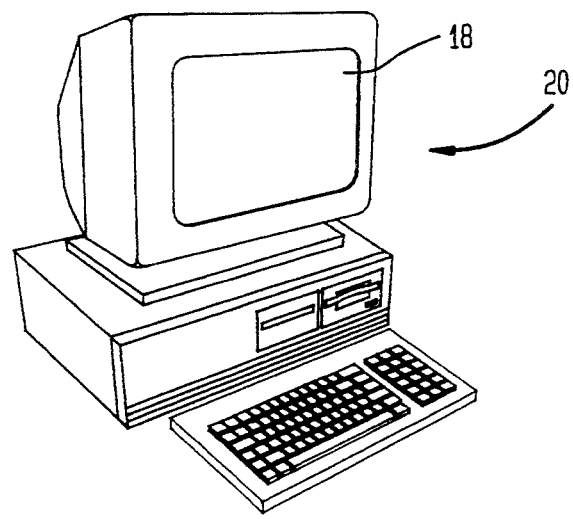
FIG. 3 is a schematic view of a work station used for implementing the method and system of the present invention.

The method and system of the present invention allow:

1. Status information from messages to be incrementally added to a display such as a display screen of a computerized work station 20 of FIG. 3; and
2. Status information from messages to be incrementally removed from the display.

Figure 4:
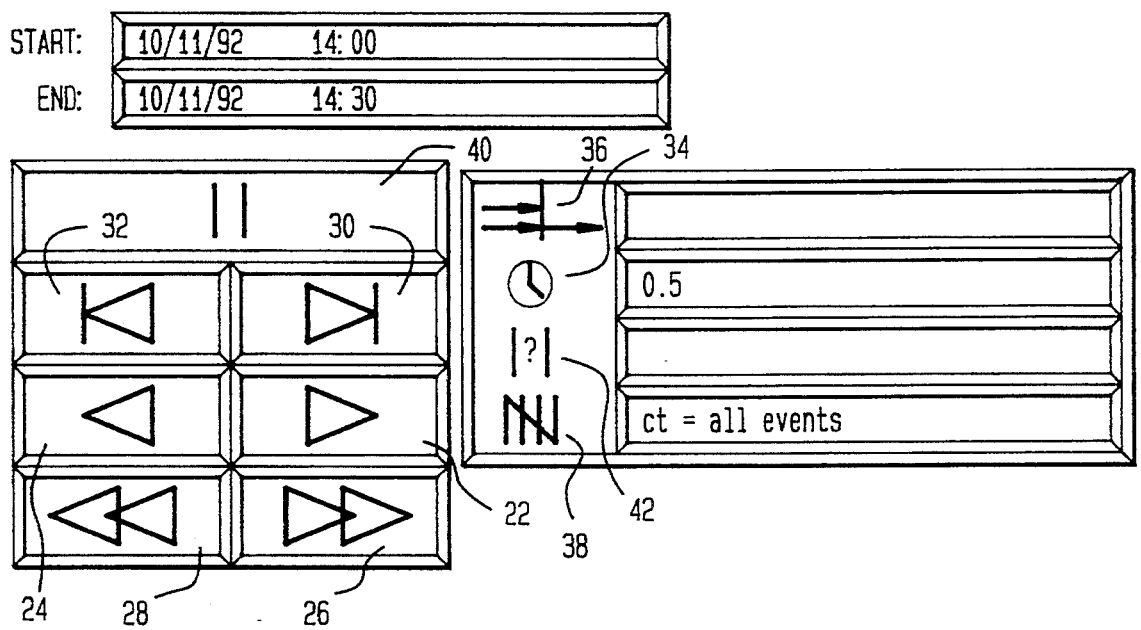
FIG. 4 is a view of a display screen illustrating various settings of a first example for use by the method and system.
Figure 5:
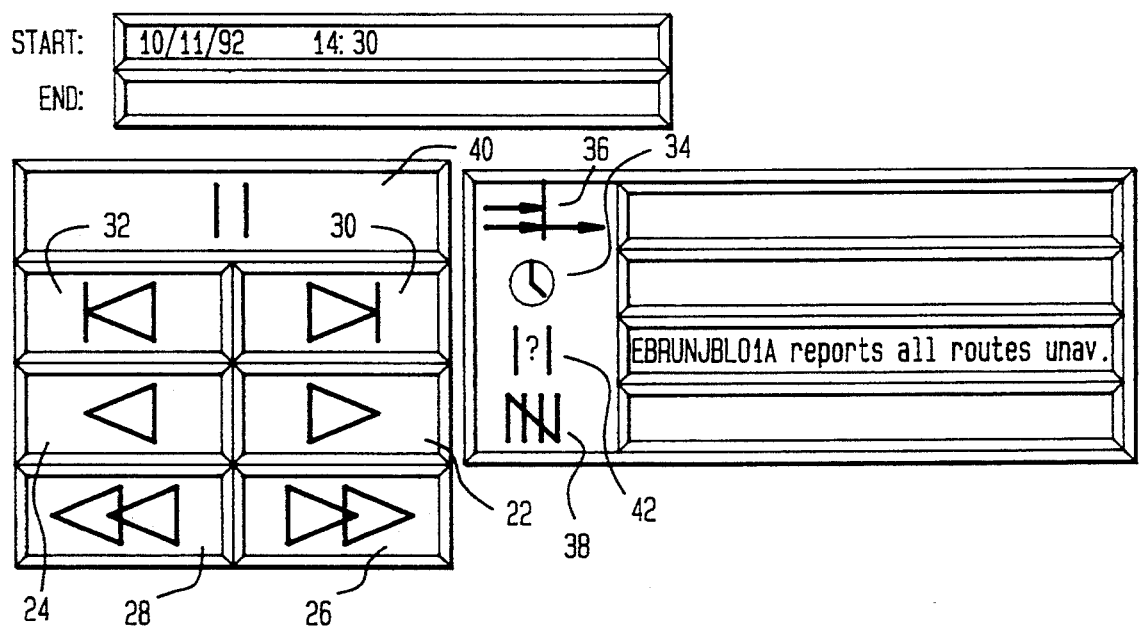
FIG. 5 is a view of a display screen illustrating various settings of a second example for use by the method and system.
Figure 6:
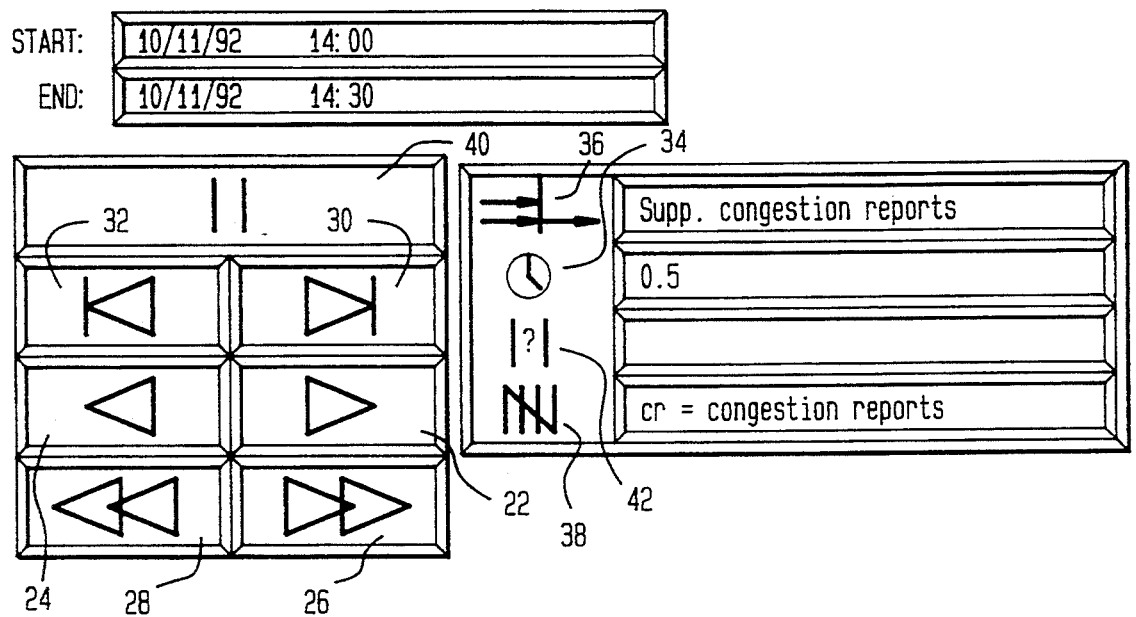
FIG. 6 is a view of a display screen illustrating various settings of a third example for use by the method and system.

As illustrated in FIGS. 4 through 6, the method and system provide the following functions as illustrated by icons displayed on the display screen 18:

(22) Forward play—show status changes simulating a time factor of real time.

(24) Backward play—show status changes in reverse simulating a time factor of real time.

(26) Forward search—show status changes as fast as possible.

(28) Backward search—show status changes in reverse as fast as possible.

(30) Forward step—show the next status change immediately.

(32) Backward step—show the next status change in reverse immediately.

(34) Time factor—use this time factor as a fraction of real time for play functions. For example, a time factor of 0.5 means show status changes in one half real time.

(36) Filter—do not show status changes matching some criteria. For example, suppress link congestion status changes.

(38) Occurrence counts—count the number of times something happened. For example, count the number of link congestion status changes. Counting should take place for all events, filtered or not.

(40) Pause—halt the display of status changes until some other function is chosen.

(42) Conditional pause—halt the display of status changes if the current status change matches some criteria. Restart when some other function is chosen. Conditional pause does not apply to filtered events.

EXAMPLE 1—FIG. 4

Suppose one wanted to show all status changes that occur between 2 p.m. and 2:30 p.m. on Oct. 11, 1992 in one half real time, storing the number of events in the variable count ct. FIG. 4 shows settings on the display screen 18 made by a user through any type of data input device such as a keyboard of the work station 20.

EXAMPLE 2—FIG. 5

Starting at 2:30 p.m. on Oct. 11, 1992, fast forward showing all events, until EBRUNJBL01A reports all routes unavailable to some node. FIG. 5 shows corresponding settings on the display screen 18.

EXAMPLE 3—FIG. 6

Show events between 2 p.m. and 2:30 p.m. on Oct. 11, 1992 in one half real time, suppressing reports of congestion, storing the number of congestion reports in the variable register cr. FIG. 6 shows corresponding settings on the display screen 18.

The following algorithm written in pseudo code implements the functions described above:

```
main ()
{
    message = 0
    currentFunction = PLAY_FORWARD
    while messagee exist in the current direction
    switch (currentFunction)
        case PLAY_FORWARD:
            wait ()
            forward
        case PLAY_BACKWARD:
            backward
            wait ()
```

```
        case SEARCH_FORWARD:
            forward ()
        case SEARCH_BACKWARD:
            backward ()
        case STEP_FORWARD:
            forward ()
            currentFunction = PAUSE
        case STEP_BACKWARD:
            backward ()
            currentFunction = PAUSE
        case PAUSE:
            do nothing
        check for new selection of currentFunction
}
displayStatus ()
{
    message = message + 1
    if message is not filtered then
        display status changes according to message
}
checkForPause ()
{
    if message meets criteria for conditional pause
        and is not filtered then
            currentFunction = PAUSE
}
adjustOccurrenceCounts (op)
{
    count = count op 1
}
removeStatus ()
{
    if message is not filtered then
        remove status changes according to message
    message = message - 1
}
wait ()
{
    difference = timestamp of (message+1) - timestamp
        of (message)
    stop processing for (difference * time)
}
forward ()
{
    displayStatus ()
    checkForPause ()
    adjustOccurrenceCounts ("+")
}
backward ()
{
    adjustOccurrenceCounts ("−")
    removeStatus ()
    checkForPause ()
}
```

The above pseudo code can be used to properly program the workstation 20 to perform the above processing and displaying of the status information.

The occurrence counts and filtering functions provided by the present invention can help identify, quantify and filter unwanted or redundant messages. For example, because congestion events have been observed to comprise up to two thirds of crisis data, counting and filtering them allow more time to be spent on more important messages, after their impact is understood. In addition, low priority events, such as individual link failures can be filtered to concentrate on linkset outages.

The stepping, time factor and searching functions allow detailed analysis of instants of time or allow the skimming of thousands of status changes covering hours of real time. Hundreds of links may be found to fail in a few seconds, but there may be instances in which a failed component might not be restored for several hours.

The pause and conditional pause functions allow fast forwarding through hours of data without worrying about missing important events. This, in turn, allows identification of critical time periods that deserved more detailed attention.

The method and system described herein is capable of providing network-wide, iterative analysis of outages of a network, such as a CCS network, while increasing the efficiency of the analysis by providing a logical shrinking of the data through the replay functions. The method and system allow simultaneous events to be presented clearly. In addition, the invention can enhance training by providing a method for simulating a crisis for future network personnel. Overall, the invention yields a better understanding of network outages than has been possible until now.

Although the scenarios presented here refer specifically to analyzing outages of the CCS network, the replay capabilities are generally applicable to any domain that monitors status changes.

While the best mode for carrying out the invention has been described in detail, those familiar with the art to which this invention relates will recognize various alternative designs and embodiments for practicing the invention as defined by the following claims.

What is claimed is:

1. In a support system for a communications network, a method for presenting to a user status information of the communications network generated upon a change in status of the network at a work station including a computer and a display device connected to the computer, the display device having a display screen for displaying graphic objects and text strings thereon, the method comprising the steps of:

providing a knowledge base for storing a multiplicity of information records, the information records including:

the status information that can be presented on the display screen, the status information including time data representing the time at which the status information was generated; and a set of mode control graphic objects that can be displayed on the display screen, the set of mode control graphic objects representing different modes of reviewing the status information;

displaying the set of mode control graphic objects including a time factor graphic object on the display screen;

selecting at least one of the set of mode control graphic objects displayed on the display screen to identify a desired mode of review of the status information;

receiving a start command initiated by the user;

receiving a time factor command initiated by the user;

displaying a start time on the display screen in response to the start time command;

displaying a numerical value associated with the time graphic object on the display screen in response to the time factor command;

sequentially reviewing the status information of the communications network based on the identified mode of review, the time data of the status information, the start time command and the time factor command; and displaying status information of the communications network on the display screen based on the results of the step of reviewing.

2. The method as claimed in claim 1 further comprising the steps of:

receiving an end time command initiated by the user; and displaying an end time on the display screen in response to the end time command, the step of reviewing being performed on the status information having time data indicating a time between the start time and the end time.

3. The method as claimed in claim 1 further comprising the steps of:

displaying a conditional pause graphic object on the display screen;

receiving a conditional pause command initiated by the user; and displaying a text string associated with the conditional pause graphic object on the display screen in response to the conditional pause command, the step of reviewing also being based on the conditional pause command.

4. The method as claimed in claim 1 further comprising the steps of:

displaying a filter graphic object on the display screen;

receiving a filter command initiated by the user; and displaying a text string associated with the filter graphic object on the display screen in response to the filter command, the step of reviewing also being based on the filter command.

5. The method as claimed in claim 1 further comprising the steps of:

displaying a count graphic object on the display screen;

receiving a count command initiated by the user; and displaying a text string associated with the count graphic object on the display screen in response to the count command, the step of reviewing including the step of determining the number of status changes related to the count command.

6. The method as claimed in claim 1 wherein the set of mode control graphic objects includes a button and a pause icon superimposed thereon.

7. The method as claimed in claim 1 wherein the set of mode control graphic objects includes a button and a forward play icon superimposed thereon.

8. The method as claimed in claim 1 wherein the set of mode control graphic objects includes a button and a backward play icon superimposed thereon.

9. The method as claimed in claim 1 wherein the set of mode control graphic objects includes a button and a forward search icon superimposed thereon.

10. The method as claimed in claim 1 wherein the set of mode control graphic objects includes a button and a backward search icon superimposed thereon.

11. The method as claimed in claim 1 wherein the set of mode control graphic objects includes a button and a forward step icon superimposed thereon.

12. The method as claimed in claim 1 wherein the set of mode control graphic objects includes a button and a backward step icon superimposed thereon.

13. In a support system for a communications network, a computer system for presenting to a user status information generated upon a change in status of the network at a work station including a computer and a display device connected to the computer, the display device having a display screen for displaying graphic objects and text strings thereon, the system comprising:

a knowledge base for storing a multiplicity of information records, said knowledge base including:

means for denoting the status information that can be presented on the display screen, the status information including time data representing the time at which the status information was generated; and means for denoting a set of mode control graphic objects that can be displayed on the display screen, the set of mode control graphic objects representing different modes of reviewing the status information;

means for displaying the set of mode control graphic objects including a time factor graphic object on the display screen;

means for selecting at least one of the set of mode control graphic objects displayed on the display screen to identify a desired mode of review of the status information;

means for receiving from the user a start time command and a time factor command;

means for displaying a start time on the display screen in response to the start time command and for displaying a numerical value associated with the time factor graphic object on the display screen in response to the time factor command;

reviewing means for sequentially reviewing the status information of the communications network based on the identified desired mode of review, the time data of the status information, the start time command and the time factor command; and means for displaying status information on the display screen based on the results of the reviewing.

14. The system as claimed in claim 13 further comprising:

means for receiving an end time command initiated by the user; and means for displaying an end time on the display screen in response to the end time command, the reviewing means reviewing the status information having time data indicating a time between the start time and the end time.

15. The system as claimed in claim 13 further comprising:

means for displaying a conditional pause graphic object on the display screen;

means for receiving a conditional pause command initiated by the user; and means for displaying a text string associated with the conditional pause graphic object on the display screen in response to the conditional end command, the reviewing means reviewing the status information based on the conditional pause command.

16. The system as claimed in claim 13 further comprising:

means for displaying a filter graphic object on the display screen;

means for receiving from the user a filter command; and means for displaying a text string associated with the filter graphic object on the display screen in response to the filter command, the reviewing means reviewing the status information based on the filter command.

17. The system as claimed in claim 13 further comprising:

means for displaying a count graphic object on the display screen;

means for receiving from the user a count command; and means for displaying a text string associated with the count graphic object on the display screen in response to the count command, the reviewing means including means for determining the number of status changes related to the count command.

18. The system as claimed in claim 13 wherein the set of mode control graphic objects includes a button and a pause icon superimposed thereon.

19. The system as claimed in claim 13 wherein the set of mode control graphic objects includes a button and a forward play icon superimposed thereon.

20. The system as claimed in claim 13 wherein the set of mode control graphic objects includes a button and a backward play icon superimposed thereon.

21. The system as claimed in claim 13 wherein the set of mode control graphic objects includes a button and a forward search icon superimposed thereon.

22. The system as claimed in claim 13 wherein the set of mode control graphic objects includes a button and a backward search icon superimposed thereon.

23. The system as claimed in claim 13 wherein the set of mode control graphic objects includes a button and a forward step icon superimposed thereon.

24. The system as claimed in claim 13 wherein the set of mode control graphic objects includes a button and a backward step icon superimposed thereon.

* * * * *